US010911373B2

(12) United States Patent
Babcock et al.

(10) Patent No.: US 10,911,373 B2
(45) Date of Patent: Feb. 2, 2021

(54) SMART AUTOSCALING OF A CLUSTER FOR PROCESSING A WORK QUEUE IN A DISTRIBUTED SYSTEM

(71) Applicant: Amazon Technologies, Inc., Reno, NV (US)

(72) Inventors: Trevor Babcock, Portland, OR (US); Dustin Encelewski, Clackamas, OR (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 16/011,204

(22) Filed: Jun. 18, 2018

(65) Prior Publication Data

US 2019/0140978 A1    May 9, 2019

Related U.S. Application Data

(63) Continuation of application No. 14/211,541, filed on Mar. 14, 2014, now Pat. No. 10,003,550.

(51) Int. Cl.
*H04L 12/911* (2013.01)
(52) U.S. Cl.
CPC .................................. *H04L 47/823* (2013.01)
(58) Field of Classification Search
CPC ..................................................... H04L 47/823
See application file for complete search history.

(56) References Cited

U.S. PATENT DOCUMENTS

| 8,775,648 | B1 | 7/2014 | Cassidy |
| 10,191,954 | B1* | 1/2019 | Corley ................. G06F 16/258 |
| 2010/0017516 | A1* | 1/2010 | Sparrell ......... H04N 21/234336 709/226 |
| 2010/0131674 | A1* | 5/2010 | Vecchio ............. H04N 21/2662 709/246 |
| 2011/0247003 | A1* | 10/2011 | Fong ..................... G06F 9/5061 718/104 |
| 2012/0180063 | A1 | 7/2012 | Rawlings |
| 2013/0024568 | A1 | 2/2013 | Popczynski |
| 2013/0222523 | A1* | 8/2013 | Shanmukhadas ...... H04N 19/40 348/14.08 |
| 2014/0075222 | A1* | 3/2014 | Jackson .................. G06F 1/329 713/320 |

(Continued)

OTHER PUBLICATIONS

Non-Final Office Action dated Jan. 22, 2016, issued in U.S. Appl. No. 14/211,541.

(Continued)

*Primary Examiner* — Michael A Keller
(74) *Attorney, Agent, or Firm* — Hogan Lovells US LLP

(57) ABSTRACT

An apparatus comprising a method for allocating shared processing resources, comprising the steps of (A) predicting a first amount of processing resources needed to complete each of a plurality of transcoding jobs in a work queue of a project, (B) determining a second amount of processing resources available prior to processing the project and (C) adding processing resources needed to complete the project. The processing resources are added in a fixed number of predetermined processing units. The fixed number of computer resources are added (a) to minimize an overall use of said processing resources needed to complete the project and (b) to complete the project within a target time.

20 Claims, 4 Drawing Sheets

(56) References Cited

U.S. PATENT DOCUMENTS

2014/0137110 A1  5/2014  Engle
2014/0337535 A1* 11/2014  Pearce ................... H04L 47/52
                                                           709/226

OTHER PUBLICATIONS

Final Office Action dated Jul. 27, 2016, issued in U.S. Appl. No. 14/211,541.
Non-Final Office Action dated Feb. 3, 2017, issued in U.S. Appl. No. 14/211,541.
Final Office Action dated Oct. 5, 2017, issued in U.S. Appl. No. 14/211,541.
Notice of Allowance dated Mar. 5, 2018 issued in U.S. Appl. No. 14/211,541.

* cited by examiner

SMART AUTOSCALING OF A CLUSTER FOR PROCESSING A WORK QUEUE IN A DISTRIBUTED SYSTEM

CROSS-REFERENCE TO RELATED APPLICATIONS

This application is a continuation of U.S. Ser. No. 14/211,541, entitled "Smart Autoscaling of a Cluster for Processing a Work Queue in a Distributed System," filed Mar. 14, 2014, which disclosure is incorporated by reference in its entirety herein.

FIELD OF INVENTION

The present invention relates to video processing generally and, more particularly, to a method and/or architecture for smart autoscaling of a cluster for processing a work queue in a distributed system.

BACKGROUND

The present invention relates to video processing generally and, more particularly, to a method and/or architecture for smart autoscaling of a cluster for processing a work queue in a distributed system.

SUMMARY OF THE INVENTION

The present invention concerns a method for allocating shared processing resources, comprising the steps of (A) predicting a first amount of processing resources needed to complete each of a plurality of transcoding jobs in a work queue of a project, (B) determining a second amount of processing resources available prior to processing the project and (C) adding processing resources needed to complete the project. The processing resources are added in a fixed number of predetermined processing units. The fixed number of computer resources are added (a) to minimize an overall use of said processing resources needed to complete the project and (b) to complete the project within a target time.

The objects, features and advantages of the present invention include providing an autoscaling method or apparatus that may (i) provide proactive scaling, (ii) operate in a distributed environment, (iii) minimize costs when allocating resources, and/or (iv) operate in a cluster processing system.

BRIEF DESCRIPTION OF THE DRAWINGS

These and other objects, features and advantages of the present invention will be apparent from the following detailed description and the appended claims and drawings in which:

DETAILED DESCRIPTION

The present invention may provide an autoscaler to proactively scale and/or allocate shared resources based on the amount of queued work relative to the best case predicted capacity of a cluster. Embodiments may also provide reactive scaling based on present cluster utilization. Embodiments may relate to a shared multi-tenant hardware configuration where multiple computers need to share common resources.

Figure 1:
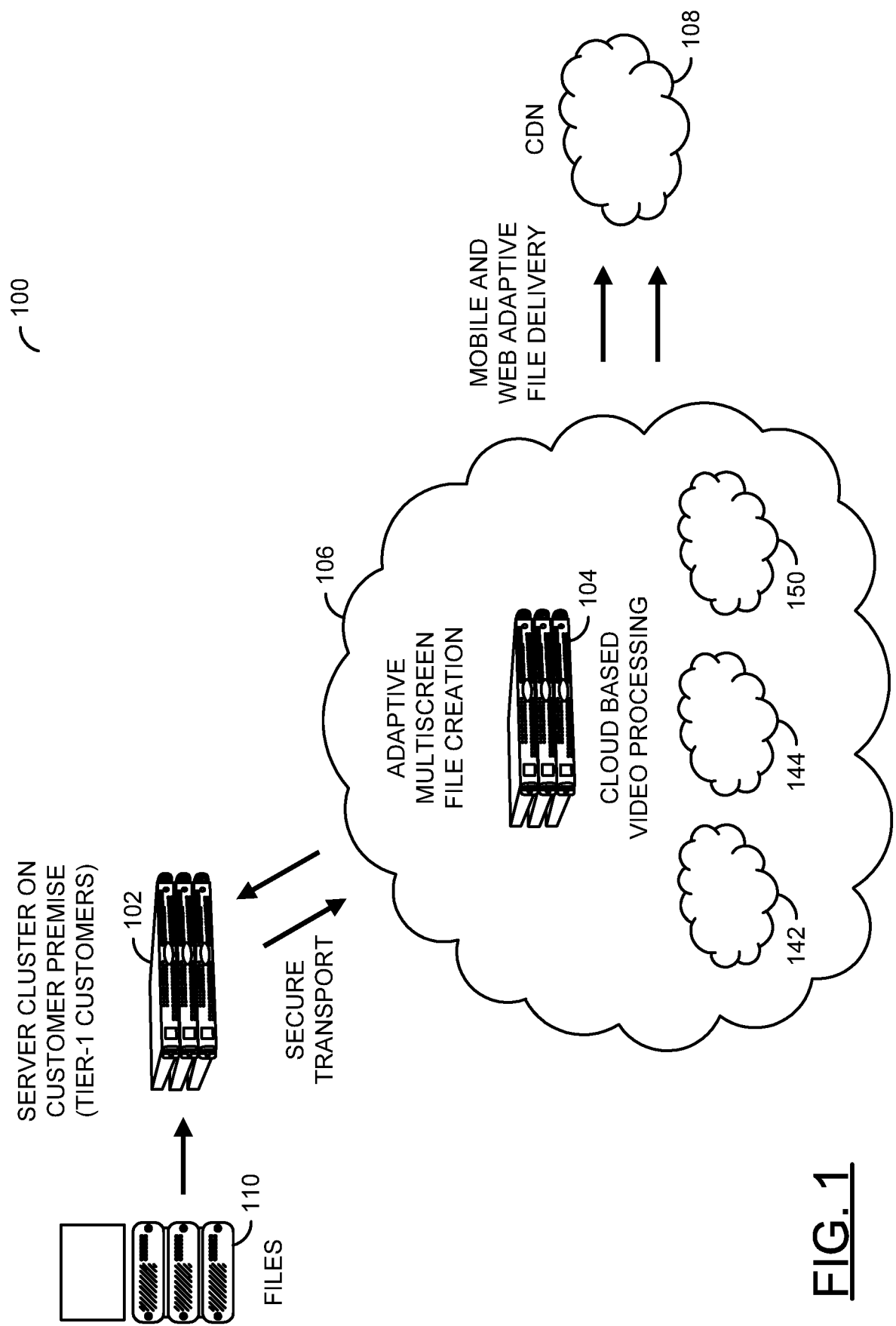
FIG. 1 is a block diagram illustrating a system in accordance with the present invention.

Referring to FIG. 1, a block diagram is shown illustrating a system 100 in accordance with an example embodiment of the present invention. In one example, the system 100 may comprise one or more ground units 102, one or more computing units 104, a first network 106, and a second network 108. The ground units 102 may be implemented, in one example, as a file based video processing system configured to provide fast, high-quality video transcoding for multi-screen video applications. The ground units 102 generally utilize massively parallel hardware combined with the flexibility and forward compatibility of intelligent software.

For example, the ground units 102 may utilize graphics processing units (GPUs) to deliver simultaneous, faster-than-real-time conversion of multiple high density (HD) and standard density (SD) video streams across an array of devices. The array of devices may include, but is not limited to televisions (TVs), personal computers (PCs), tablets, personal digital assistants (PDAs), mobile phones, etc.

In one example, the ground units 102 may be implemented using a file-based video processing system that provides fast, high-quality video transcoding for multi-screen video applications (e.g., Elemental™ Server from Elemental Technologies Inc., Portland, Oreg.).

In another example, a single ground unit 102 or a cluster of ground units 102 may be located on the premises of a customer (e.g., tier 1 customers). The cloud computing units 104 may be implemented, in one example, as file-based video processing systems configured to provide fast, high-quality video transcoding for multi-screen video applications. The computing units 104 may be implemented as one or more cloud based video processing units. The cloud units 104 may implement massively parallel hardware combined with the flexibility and/or forward compatibility of intelligent software. For example, the cloud units 104 may utilize graphics processing units (GPUs) to deliver simultaneous, faster-than-real-time conversion of multiple high density (HD) and standard density (SD) video streams across an array of devices. The array of devices may include, but is not limited to televisions (TVs), personal computers (PCs), tablets, personal digital assistants (PDAs), mobile phones, etc. In one example, the cloud units 104 may be implemented using an Elemental™ Server appliance from Elemental Technologies Inc., Portland Oreg., an Amazon Elastic Compute Cloud, Microsoft cloud resources, Apple iCloud, etc.

The cloud computing units 104 may reside on the first network 106. In one example, the cloud computing units 104 may be implemented as virtual servers. The first network 106 may be a network configured to store shared computer resources. The shared resources may include shared workers (e.g., 142), shared storage (e.g., 144), a database or cloud work queue (e.g., 150). In one example, the second network 108 may be implemented as a content distribution network (CDN).

In another example, the first network 106 may be implemented as a mobile carrier network. However, other networks and/or combinations of networks may be implemented accordingly to meet the design criteria of a particular implementation.

In one example, the system 100 may be configured to communicate a file 110 (or files) from the customer (content provider) location to the database 150. For example, the file(s) 110 may be received by the ground unit(s) 102. The ground unit(s) 102 may be configured to process the file(s) 110 for transmission via secure transport to the database 150. The cloud computing units 104 may be configured to further process the file(s) 110 sent from the ground unit(s) 102 (to be described in more detail in connection with FIGS. 2-4).

In one example, the ground units 102 and/or the cloud computing units 104 may be configured to process the video content using a heterogeneous video processing technique that divides processing tasks between one or more central processing units (CPUs) and a graphics processing unit (GPU) that includes many parallel stream processors configured in an array. An example of such a heterogeneous video processing technique may be found in co-pending U.S. patent application Ser. No. 12/342,145, filed Dec. 23, 2008, which is hereby incorporated by reference in its entirety.

In one example, the cloud computing units 104 may comprise a cluster of graphics processors whose capabilities may be harnessed by, for example, Amazon EC2 cluster GPU instances running a family of services (e.g., Elemental Accelerated Cloud Transcoding, or Elemental™ ACT, from Elemental Technologies Inc., Portland Oreg.) that provides elastic transcoding capacity in the cloud.

In common shared resource models, a call is made from a client to allocate fixed units of resources. The client is charged on a per hour basis. The charge may be in the form of an invoice (e.g., in a public model) or a deduction from an agreed amount of shared resources (e.g., in a private model). Embodiments of the invention manage the resource calls to avoid unnecessary calls for resources.

For example, if an amount of work needed to complete a project is known (e.g., in a video transcoding environment), additional calls may be avoided if the current calls are sufficient to complete the project. A virtualization layer receives calls from the cloud computing units 104 (to be described in more detail in connection with FIG. 2). In one embodiment, resources may be reserved by looking ahead at the amount of work that is expected. Reserving resources may allow a lower cost per resource (possibly in exchange for a reservation fee). The cloud computing units (or server) 104 manage how and when to request resources and/or to reserve resources. Reserved resources may be resources that are provisioned and cannot be used by anyone and/or anything else until the cloud computing units 104 release the provisioned resources. The resource minimization feature of the server 104 may be applicable to processing that does not necessarily need to be performed in real time. The server 104 may be useful for processing items such as video transcoding.

In a typical commercial video streaming service, a large number of different video streams are generated. Each stream is typically transcoded from a master source. Basic services may generate a small number of streams for basic distribution (e.g., high resolution, medium resolution, and low resolution). Advanced services generate more streams, sometimes on the order of hundreds of different streams.

The different streams may each have a different quality, bitrate, etc. Certain streams are specifically tailored for certain devices, such as a particular type of smart phone, tablet, etc. When a large number of these tailored streams are generated, a significant amount of processing resources may be needed. The server 104 manages the time and/or amount of resources used. The server 104 adds an efficiency element to manage the allocation of the resources.

In a public cloud model, resources are shared between a very large number of competing clients. The cost of using the common resources is managed in a public cloud type configuration by charging for the resources. The charges are often on a per hour basis. If a resource starts in a particular hour, but only uses several minutes of processing, a full hour is often charged. Other types of cloud computing environments, such as a private cloud, limit the number of clients that use the private cloud. Agreements on the number of resources used may be in place. Such configurations still need to manage resources so that each of the clients can utilize the resources in accordance with pre-arranged agreements. Even without a cost per resource model, some sort of reservation model is typically implemented.

Embodiments of the invention may be applicable to work such that the overall processing needed to complete the project can be estimated before the work starts. While video transcoding is one application, non-video transcoding, such as audio transcoding, problem solving, etc., may be used. In one example, a large problem solving type application may be used as a low priority job that may be filled in with other jobs to maximize the entire amount of processing allocated (or reserved). In one example, one hour of processing may be allocated at a time. If an amount of time less than an hour is used, the client is still charged for the entire hour. By adding a low priority processing to such a system, the overall resources are more efficiently managed.

In a video application, one stream may be a high definition stream (generally processing dependent), another may be a standard definition stream (average processing dependent), a cellular stream may be lower definition (even less processing dependent). On the other end of the spectrum, newer video standards, such as 4K resolution, use even more processing power. A 4K stream may use so much more processing power that it may be allocated as a lower priority item. For example, the 4K stream may have a lower priority because it may not be accessed as often as shorter streams. With such an approach, the shorter streams may be quickly generated, with the 4K stream being the last to be completed.

Figure 2:
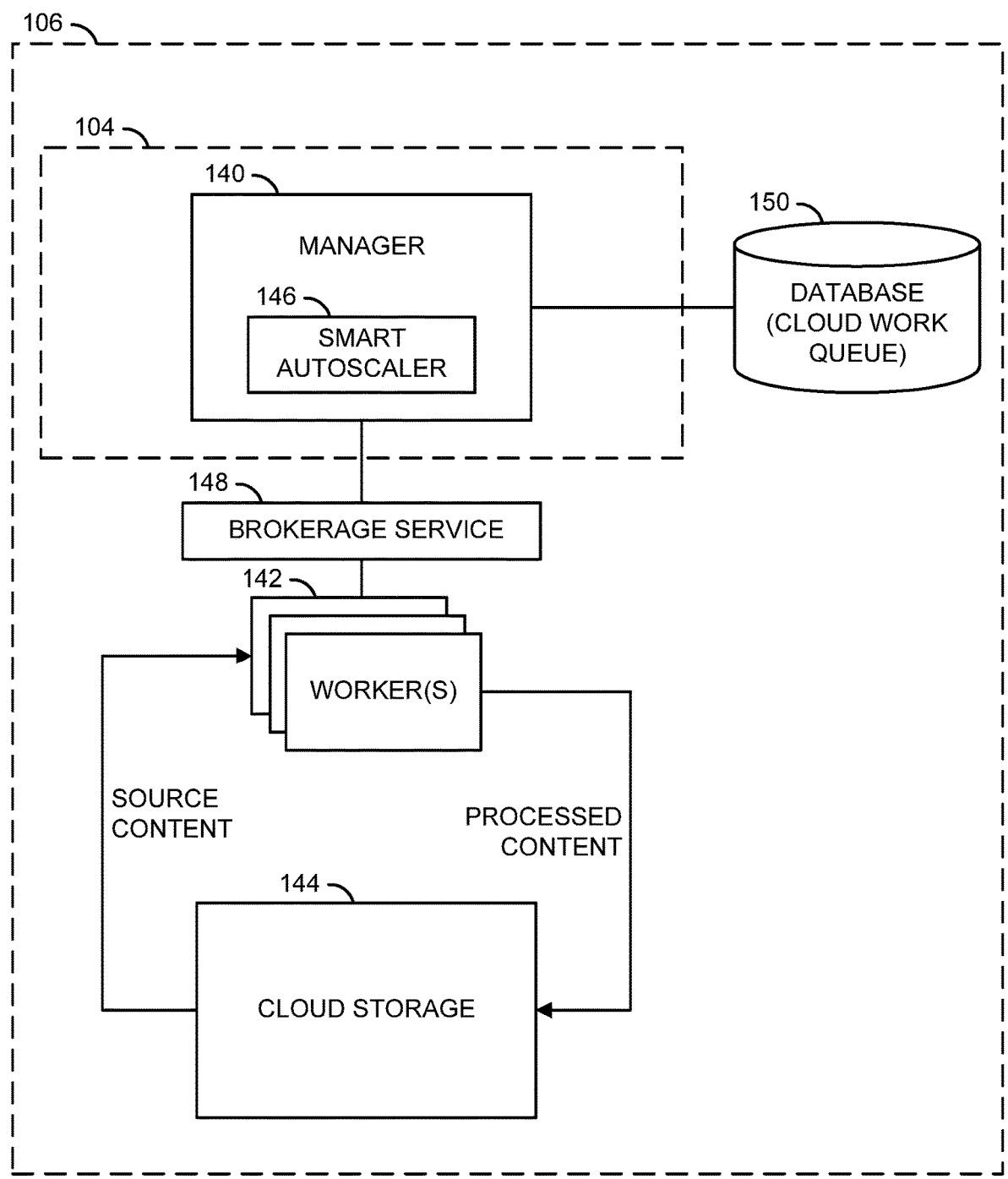
FIG. 2 is a more detailed diagram of an aspect of the invention.

Referring to FIG. 2, a more detailed diagram of the first network 106 is shown. The server 104 is shown included in the shared resources network 106. In another example, the server 104 may be implemented as a ground based server. The server 104 may include a manager 140. The manager 140 may include a smart autoscaler 146. The shared resource network 106 may include a block (or circuit) 150 that may be implemented as a database. The shared resource network 106 may include a block (or circuit) 148 that may be implemented as a brokerage service. The brokerage service 148 may be a virtualization layer. The virtualization layer 148 may provide virtual resources to an application. The virtualization layer 148 may receive calls from the server 104.

Providers of the brokerage service(s) 148 may offer virtual machines and/or other resources. Large numbers of virtual machines may be configured to scale services up and down according to the varying needs of a customer. Additional resources may be offered such as a virtual-machine disk image library, raw (block) and file-based storage, firewalls, load balancers, IP addresses, virtual local area networks (VLANs), software bundles, etc. Providers of the brokerage service(s) 148 may supply resources on-demand from large pools installed in data centers. Users of the brokerage service 148 may deploy applications by installing operating-system images and/or application software on the cloud infrastructure. The user may maintain the operating systems and/or the application software. Providers of the brokerage service 148 may bill for services on a utility computing basis where the cost reflects the amount of resources allocated and/or consumed.

The block(s) 142 may represent a number of workers (e.g., video processing devices). The block 144 may represent a cloud storage device. The block 142 may present a signal (e.g., PROCESSED_CONTENT) to the storage block 144. The storage block 144 may present a signal (e.g., SOURCE_CONTENT) to the worker block(s) 142. In one example, video transcoding (or other processing) may be implemented within the resources of the shared resource network 106.

Figure 3:
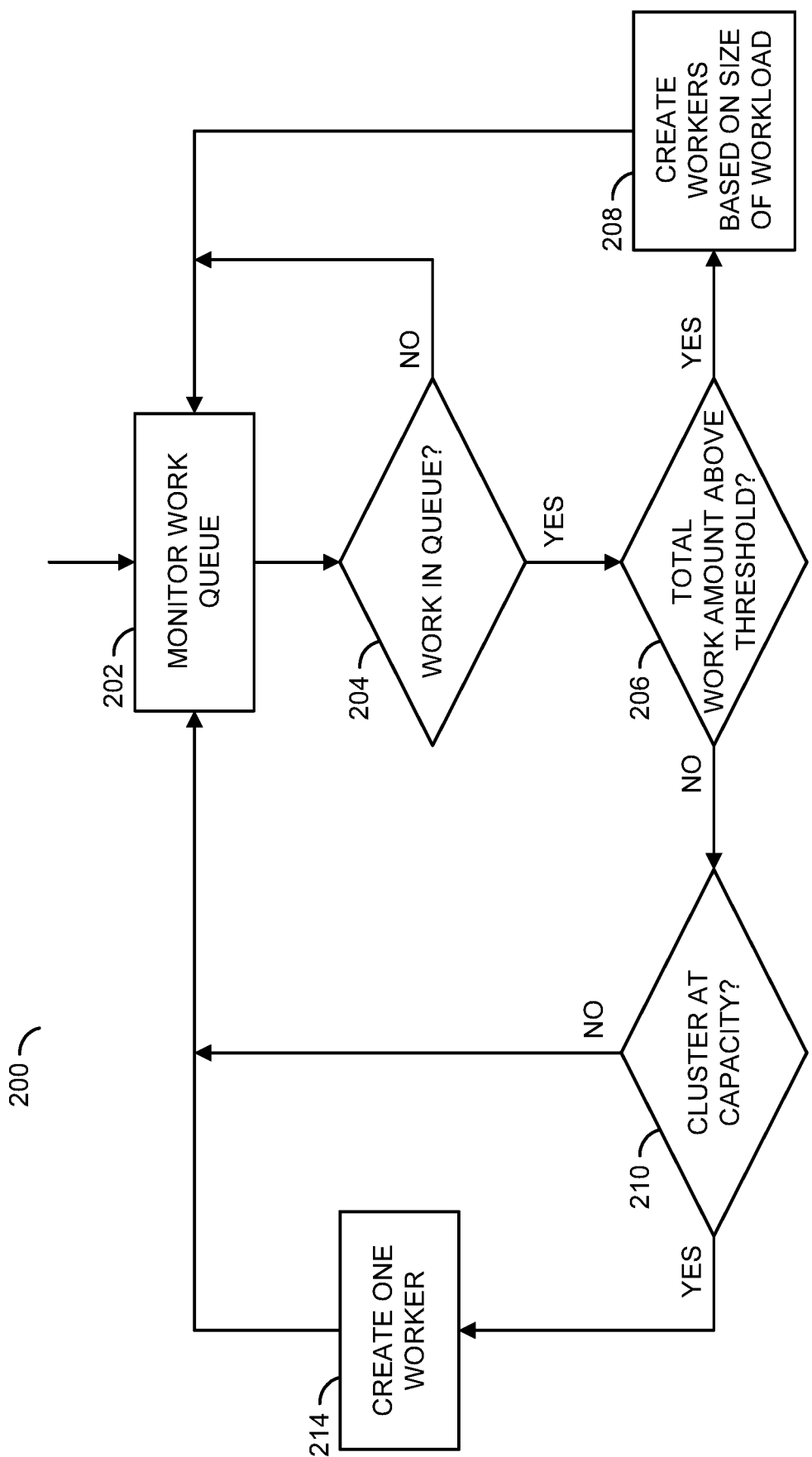
FIG. 3 is a logic and data flow diagram.

Referring to FIG. 3, a flow diagram of a process 200 is shown. The process 200 generally comprises a step (or state) 202, a decision step (or state) 204, a decision step (or state) 206, a step (or state) 208, a decision step (or state) 210, a step (or state) 212. The step 202 may monitor the work queue. The decision step 204 may determine whether work is in the queue. If there is not work in the queue, the method 200 moves back to the step 202. If there is work in the queue, the method 200 moves to the decision step 206. The decision step 206 may determine the total amount of work is above a predetermined threshold.

If the threshold is exceeded, the method 200 moves to the step 208. If not, the method 200 moves to the decision step 210. The step 208 creates workers based on the size of a work load. Next, the method 200 moves back to the state 202. The decision step 210 determines whether a particular cluster is at capacity. If not, the method 200 moves back to the step 202. If so, the method 200 moves to the state 212, which creates an additional one or more workers.

Figure 4:
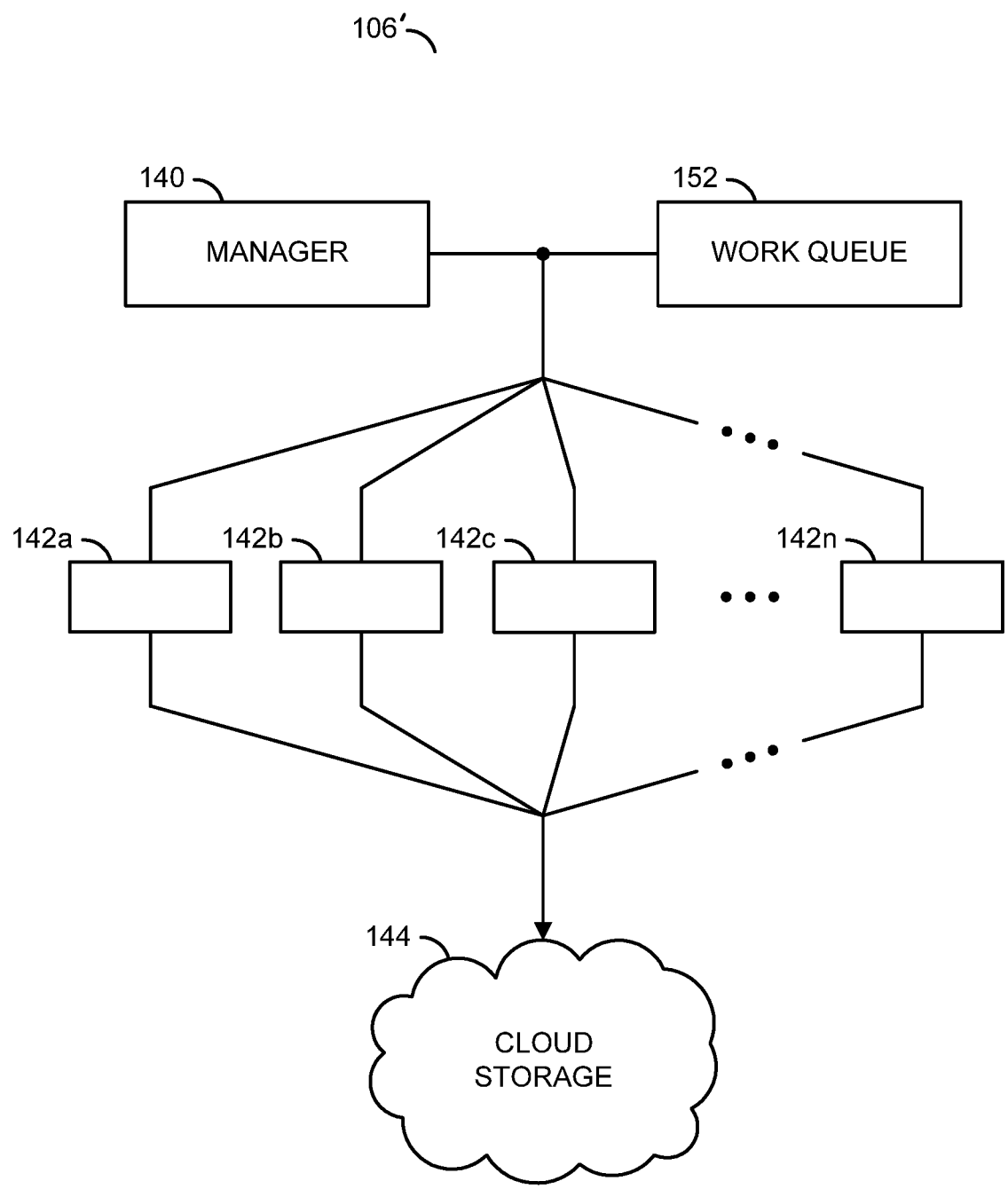
FIG. 4 is a more detailed diagram of a physical system architecture.

Referring to FIG. 4, a more detailed diagram of a physical system architecture of the shared resource network 106' is shown. The physical system architecture of the shared resource network 106' is shown implementing a plurality of workers 142a-142n. The physical system architecture of the shared resource network 106' may implement a block (or circuit) 152. The block 152 may be a work queue.

The manager 140 of the server 104 may intelligently decide when to scale processing resources (e.g., the workers 142a-142n) in a distributed system, based on an overall queue of work to be processed in the work queue 152. The process 200 may consider the volume and/or difficulty of work along with the capacity of the workers. The process 200 may dynamically maintain a target level of resources as the work in the file queue fluctuates. The system 100 may achieve an optimal balance of resources and/or throughput with minimal amount of human intervention.

The work queue 152 may be defined as a body of work that needs to be processed (e.g., a number of video transcoding jobs). A worker (e.g., one of the workers 142a-142n) may be defined as an agent. A number of the workers 142a-142n may be implemented. The workers 142a-142n may be implemented as a server, a virtual server, a virtual machine, a portion of a parallel processing video board, etc.

In one example, the workers 142a-142n may be cloud-based processing resources. In general, the workers 142a-142n may be used to provide video processing, video transcoding, etc. The workers 142a-142n may be used to complete work in the work queue 152 (e.g., transcode videos). The decision process 200 may be used to select an ideal number of the workers 142a-142n for a particular job. A cluster may be defined as a group of the workers 142a-142n used to process the same work queue 152.

Resources may be defined as the total number of the workers 142a-142n in a distributed system. Scaling may be defined as a process to provision and/or terminate resources. Throughput may be defined as a total volume of work processed in a given period of time. Higher throughput normally results in more work being processed.

The process 200 has several heuristics for determining when to provision more workers. For example, if queued work exceeds a certain threshold (e.g., threshold is configured by the user), more workers are provisioned. In another example, if the cluster is running at maximum capacity (e.g., the cluster cannot accept any more work) and there is still work in the work queue 152 that is not currently being processed, more workers are provisioned.

The system 100 may monitor the work queue 152 for unprocessed work. When unprocessed work is found, a calculated number of the workers 142a-142n are provisioned based on the volume of work, provided that volume of work is above the specified threshold. Each of the workers 142a-142n may have the ability to analyze the work queue 152, judge the "difficulty" of the work (e.g., the resources necessary to perform the operations), and determine if the worker is able to take on additional work from the work queue 152.

If all of the workers 142a-142n in the cluster determine that they cannot take on additional work, then the cluster is considered "at capacity" (e.g., maximum capacity). If the cluster is operating at maximum capacity, an additional worker is provisioned. If the cluster is not operating at maximum capacity, no action is taken.

As the volume of work in the work queue 152 is reduced, the Smart Autoscaler system 100 will begin terminating the workers 142a-142n until an appropriate level of resources remain. If there is no work left in the work queue 152, all resources are terminated. For example, processing resources may be released back to a pool of cloud computing resources. This cycle repeats at a periodic interval.

The system 100 may also implement an emergency backoff component. For example, if multiple consecutive failures occur when provisioning the workers 142a-142n, the Smart Autoscaler circuit 100 will shut down (e.g., stop trying to provision workers) and send an alert to the user.

The process 200 may be used in a distributed system to maintain an ideal number of the workers 142a-142n to process a queue of video transcode jobs. In one example, the process may run in a daemon that manages a cluster. The process 200 may establish a direct correlation between the work queue 152 and the capacity of the distributed system to automatically scale the workers 142a-142n as the composition of the work queue 152 changes.

Once configured, the process 200 will act intelligently with minimal human input to maintain an appropriate level of resources.

The functions performed by the diagrams of FIG. 3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multichip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

What is claimed is:

1. A method for allocating shared processing resources comprising:
   determining a level of difficulty of a plurality of transcoding jobs in a work queue, the level of difficulty indicating resource requirements for the plurality of transcoding jobs;
   determining a number of processing resources sufficient to process the plurality of transcoding jobs based on the level of difficulty;
   reserving an initial set of processing resources for processing the transcoding jobs in the work queue;
   determining that the initial set of processing resources is insufficient for processing the plurality of transcoding jobs in the work queue based on the number;
   reserving an additional set of processing resources distinct from the initial set of processing resources to process the plurality of transcoding jobs in the work queue, wherein the initial set of processing resources and the additional set of processing resources are arranged at different locations; and
   processing at least a portion of the plurality of transcoding jobs using a combined set of processing resources comprising the initial set and the additional set.

2. The method of claim 1, wherein a total number of processing resources comprises the combined set of processes resources and a remainder set of processing resources, the method further comprising:
   processing at least a portion of a low priority job in a low priority work queue using the remainder set of processing resources.

3. The method of claim 1, further comprising:
   obtaining a work queue size threshold; and
   determining that a size of the work queue is greater than the work queue size threshold, wherein determining a number of processing resources is further based on the size of the work queue being greater than the work queue size threshold.

4. The method of claim 1, further comprising:
   determining a number of processing resources before determining the level of difficulty of the plurality of transcoding jobs, wherein the additional set of processing resources comprises the predetermined number of processing resources.

5. The method of claim 1, further comprising:
   unassigning the additional set of processing resources from the work queue after the work queue is below a predetermined threshold.

6. The method of claim 1, further comprising:
   provisioning a server in a shared resource configuration, wherein the processing of at least a portion of the plurality of transcoding jobs is performed by the server.

7. The method of claim 1, further comprising:
   provisioning video processing engines in a shared resource configuration, wherein the number of predetermined processing resources comprises the video processing engines.

8. The method of claim 1, further comprising:
   determining a number of resources sufficient to complete the plurality of transcoding jobs within a target time, wherein the determining of the number of processing resources is further based on the number of resources sufficient to complete the plurality of transcoding jobs within the target time.

9. The method of claim 1, further comprising:
   determining a volume of the plurality of transcoding jobs, wherein the determining of the number of processing resources is further based on the volume of the plurality of transcoding jobs.

10. The method of claim 1, further comprising:
    provisioning a reserve set of processing resources, wherein the additional set of processing resources is the reserve set.

11. A system, comprising:
at least one processor; and
memory including instructions that, when executed by the at least one processor, cause the storage device to:
determine a level of difficulty of a plurality of transcoding jobs in a work queue, the level of difficulty indicating resource requirements for the plurality of transcoding jobs;
determine a number of processing resources sufficient to process the plurality of transcoding jobs based on the level of difficulty;
reserve an initial set of processing resources for processing the transcoding jobs in the work queue;
determine that the initial set of processing resources is insufficient for processing the plurality of transcoding jobs in the work queue based on the number;
reserve an additional set of processing resources distinct from the initial set of processing resources to process the plurality of transcoding jobs in the work queue, wherein the initial set of processing resources and the additional set of processing resources are remote from one another; and
process at least a portion of the plurality of transcoding jobs using a combined set of processing resources comprising the initial set and the additional set.

12. The system of claim 11, wherein a total number of processing resources comprises the combined set of processes resources and a remainder set of processing resources, wherein the instructions when executed further cause the system to:
process at least a portion of a low priority job in a low priority work queue using the remainder set of processing resources.

13. The system of claim 11, wherein the instructions when executed further cause the system to:
obtain a work queue size threshold; and
determine that a size of the work queue is greater than the work queue size threshold, wherein determining a number of processing resources is further based on the size of the work queue being greater than the work queue size threshold.

14. The system of claim 11, wherein the instructions when executed further cause the system to:
determine a number of processing resources before determining the level of difficulty of the plurality of transcoding jobs, wherein the additional set of processing resources comprises the predetermined number of processing resources.

15. The system of claim 11, wherein the instructions when executed further cause the system to:
unassign the additional set of processing resources from the work queue after the work queue is below a predetermined threshold.

16. The system of claim 11, wherein the instructions when executed further cause the system to:
provision a server in a shared resource configuration, wherein the processing of at least a portion of the plurality of transcoding jobs is performed by the server.

17. The system of claim 11, wherein the instructions when executed further cause the system to:
provision video processing engines in a shared resource configuration, wherein the number of predetermined processing resources comprises the video processing engines.

18. A non-transitory computer-readable storage medium including instructions when executed by a processor of a computing system, cause the processor to:
determine a level of difficulty of a plurality of transcoding jobs in a work queue, the level of difficulty indicating resource requirements for the plurality of transcoding jobs;
determine a number of processing resources sufficient to process the plurality of transcoding jobs based on the level of difficulty;
reserve an initial set of processing resources for processing the transcoding jobs in the work queue;
determine that the initial set of processing resources is insufficient for processing the plurality of transcoding jobs in the work queue based on the number;
reserve an additional set of processing resources distinct from the initial set of processing resources, wherein the initial set of processing resources and the additional set of processing resources are communicatively coupled over a network and remote from one another; and
process at least a portion of the plurality of transcoding jobs using a combined set of processing resources comprising the initial set and the additional set.

19. The non-transitory computer-readable storage medium of claim 18, wherein a total number of processing resources comprises the combined set of processes resources and a remainder set of processing resources, wherein the instructions further cause the processor to:
process at least a portion of a low priority job in a low priority work queue using the remainder set of processing resources.

20. The non-transitory computer-readable storage medium of claim 18, wherein the instructions further cause the processor to:
obtain a work queue size threshold; and
determine that a size of the work queue is greater than the work queue size threshold, wherein determining a number of processing resources is further based on the size of the work queue being greater than the work queue size threshold.

* * * * *